Patented Apr. 24, 1945

2,374,453

UNITED STATES PATENT OFFICE 2,374,453

PROCESS FOR PRODUCING FERROUS CHLORIDE

Thomas C. Oliver, Jackson Heights, N. Y., and Ralph D. Long and Leo H. Crosson, Charlotte, N. C., assignors to Charlotte Chemical Laboratories, Inc., a corporation of North Carolina No Drawing. Application March 27, 1941, Serial No. 385,530

5 Claims. (Cl. 23—87)

In the steel industry and in the manufacture of certain paint pigments there are produced annually tremendous quantities of a waste material, viz. ferrous sulfate, which has proven of little or no commercial value and is accordingly disposed of as pure waste. Hundreds of tons of this waste are produced daily as a by-product in the production of titanium oxide pigment by digesting iron bearing titanium ores with sulfuric acid. Likewise, very large quantities of the ferrous sulfate are obtained as a waste product in steel mills where the sheets of steel are pickled in sulphuric acid baths.

Because of the magnitude of this problem many attempts have been made by the various manufacturers and research laboratories to find a commercial use or outlet for the waste ferrous sulfate. As far as we are aware none of these attempts has proven commercially successful and the product is still being disposed of as waste at a very substantial expense for transportation on barges and trucks, in addition to the material cost.

In accordance with our invention we have found a surprisingly simple yet markedly advantageous solution to this problem. It is based on the discovery that a commercially valuable product, namely, ferric chloride, can be obtained from the ferrous sulfate by certain processing. From a commercial standpoint, ferric chloride is far more valuable than ferrous sulfate today since it is largely useful in water and sewage purification, in the manufacture of dyes, in photography, in disinfectants and in chemicals.

We have found that when the ferrous sulfate is properly reacted with an alkaline earth halide, such as for example, calcium chloride, there is produced an intermediate potentially valuable product which can be converted by oxidation into the desirable ferric chloride. A typical, commercially valuable embodiment of this procedure comprises reacting ferrous sulfate with calcium chloride to produce ferrous chloride and then chlorinating or oxidizing this product to convert it into ferric chloride.

In the first reation above calcium sulfate is formed as an insoluble precipitant and may be recovered if desired. The filtrate which contains the ferrous chloride and water may be subjected to bubbling with chlorine gas which oxidizes the solution to ferric chloride. The latter may be sold in this form, or concentrated as desired to a more concentrated liquid or down to a solid.

The ferrous sulfate used may be obtained from the large waste supplies mentioned above or from any other commercially advantageous source including many chemical operations. The material is available in several forms; both anhydrous and hydrous, e. g., $FeSO_4$ or $FeSO_4 nH_2O$ in which $n$ may be anything from ½ to 7. The calcium chloride is an inexpensive product and in fact is substantially in the category of a waste product since very large quantities of it are available. It is produced commercially in large quantity, for example, as a by-product in the Solvay soda and other processes. A commercially valuable method of manufacture of this material for use in our present process is disclosed in our copending application Serial No. 396,154, filed May 31, 1941, for Process for utilizing waste materials.

Substantial variations are permissible in the reaction conditions, including time, temperature, pressure and amounts of materials. The reaction proceeds promptly upon mixing of the materials in aqueous solution and may be permitted to continue for an hour or more. Agitation, for example, with an electric stirrer, of the reacting solution is helpful to cause the reaction to go towards completion. Also, it prevents the calcium chloride from becoming coated with calcium sulfate or ferrous chloride which would tend to slow the reaction. The precipitate, e. g., calcium sulfate, may be washed thoroughly with water to remove the desired adhering ferrous chloride and thereby increase the yield.

The temperature used may vary over a wide range below and above atmospheric temperatures. We have found that a temperature of about 70° C. is advantageous since at this temperature the ferrous sulfate reaches maximum solubility and therefore a more concentrated solution of ferrous chloride can be obtained at this temperature.

The pressure may be sub or super atmospheric but we have found normal atmospheric pressure to be entirely satisfactory.

While the respective amounts of the reacting substances may be varied appreciably we have obtained very satisfactory results with molecular quantities of the reactants. In practice it is usually desirable to use a slight excess of calcium chloride such as 2% to 5% excess so as to be sure of converting all of the ferrous sulfate.

One of the characteristic and commercially advantageous features of our invention is that mixed salts or complex products do not result from our reaction, even though the molecular quantities of the reactants are changed considerably. We definitely produce by our process, ferrous chloride in the first instance and finally ferric chloride without chemical combinations of these substances with the other materials present. Apparently one of the reasons for this is that we start with ferrous sulfate rather than some of the other related materials, such as, for example, ferric sulfate, which are used in processes that produce mixed salts.

In this invention we are primarily interested in utilizing the otherwise waste material, ferrous sulfate, and therefore are not commercially interested in making substitutions for this reactant. With regard to the other reactant, the alkaline earth halides, with the exception of the fluorides, generally might be used but for commercial and practical reasons we have found it advantageous to use the easily available and inexpensive, calcium chloride. The alkaline earth fluorides are not desirable because of their low solubility in water.

In carrying out our process, it is not essential but is nevertheless of practical importance to have the reacting mixture sufficiently liquid or fluid for the ferrous chloride to be easily formed and separated from the precipitate. We can use either dilute solutions or solutions of any concentration up to and including saturated solutions. We find that fluidity and ease of handling of the reacting mixture is affected somewhat by the acidity of the solution and that generally speaking, control of pH of the reactants and the mixture has a definite beneficial effect on the process and the results obtained.

The pH may be varied over a fairly substantial range but we find that if it is maintained at about 1 to 3 the process may be carried out advantageously. While pH's of as high as 6 or more could be used, the process is difficult to manage in this range. The products of the reaction are difficultly separable and assume a somewhat plastic or crumbly form that requires extended stirring. For these reasons, we usually prefer a pH of about 1 or less up to about 2.5 to 3.

A typical, illustrative example of our process, with the reactions involved, is as follows:

A molecular quantity of commercial ferrous sulfate, heptahydrate form, is dissolved in water and an equimolecular quantity, plus about 5% excess, of calcium chloride is likewise dissolved in water. The respective amounts of solids and water used are controlled to produce saturated solutions at the temperature at which the reaction is carried out. The pH of the ferrous sulfate solution in this case was 1.25. This value, however, varies with different commercial forms of the ferrous sulfate and in practice will range from about 0.01 pH to about 2.80 pH. The reason for this variation is the difference in manufacture of the ferrous sulfate and depends primarily upon the amount of free acid, principally hydrochloric or sulfuric acid, that remains in the ferrous sulfate after the manufacturing process and the hydrolysis of the ferrous sulfate. The pH value of the calcium chloride in solution in various tests proves to be substantially constant. We have found that this pH in the usual case is about 7.08.

The above described saturated solutions are heated to about 70° C., mixed, and agitated for one hour with an electric stirrer. The reaction that takes place produces ferrous chloride and calcium sulfate, the latter precipitating out of solution. The pH value of the slurry, that is, the mixture of ferrous chloride and calcium sulfate in a typical case is about 1.5. However, this value will vary in accordance with the variations of pH value of the ferrous sulfate solution mentioned above and may range from about 0.015 to about 3.

The slurry is now filtered or centrifuged to separate the ferrous chloride solution from the precipitated calcium sulfate. The precipitate can now be washed with water to remove any remaining ferrous chloride. The pH of the filtrate in this case is about 1.0 but this value varies according to the variations discussed above and may range from a pH of about 0.08 to a pH of about 1.09.

To obtain ferric chloride from the above ferrous chloride filtrate we concentrate the ferrous chloride first and then pass a current of chlorine gas into the ferrous chloride solution and permit the gas to bubble through the solution until substantially complete conversion of the ferrous chloride to the ferric chloride is obtained. The ferric chloride solution thus obtained may be concentrated to any desired concentration of solution or to solid form if desired.

As suggested hereinabove the acidity or pH value of the reacting solutions may vary rather widely beginning at pH values of less than 1 and running up to values as high as 6 or more. However, we have found that for best commercial operations the pH value of the slurry should be maintained at a value of about 3 or less. At these values there is sufficient acid in the solution to render the slurry relatively fluid and easily adaptable for stirring and filtering. When the solutions are substantially less acid than indicated by a pH of about 3 the slurry is difficult to handle and requires protracted stirring or mixing operations which are difficult and time consuming. We therefore have found it commercially advantageous to carry out our process in the lower pH ranges of a pH value of about 3 or less.

Chemical equations representing the reactions that take place in the above described process are as follows:

$$FeSO_4.7H_2O + CaCl_2 \rightarrow CaSO_4.2H_2O + FeCl_2.4H_2O + H_2O$$
$$2FeCl_2.4H_2O + Cl_2 \rightarrow 2FeCl_3.6H_2O + 2H_2O$$

The above ferrous chloride $FeCl_2.4H_2O$ may be converted into desired ferric chloride $$FeCl_3.6H_2O$$

by any of the well known commercial processes including the above treatment with chlorine or, for example, by oxidizing the ferrous chloride solution. Ferric chloride may, of course, be produced by other methods, such as, for example, by the action of hydrochloric acid on iron oxides or on ferrous carbonate with subsequent crystallization. Such procedures, however, are relatively expensive and therefore make the cost of the ferric chloride relatively high. They do not have the advantage inherent in the process of our invention of using waste material, especially the ferrous sulfate.

As a modification of the foregoing process we have found it advantageous some times to repeat the reaction between the ferrous sulfate and the calcium chloride in the ferrous chloride solution for purposes of increasing the concentration of the ferrous chloride in solution. In other words, when the reaction between the ferrous sulfate and calcium chloride has been carried out as described above we may add to the resulting filtrate additional quantities of ferrous sulfate and calcium chloride and heat this mixture to the desired reaction temperature of about 70° C. and thereby produce in solution additional quantities of the ferrous chloride.

Various modifications and changes may be made in the above described process and materials without departing from the scope of our invention, some of the novel features of which are defined in the appended claims.

We claim:

1. Preparing an acid solution of ferrous sulphate having a pH of 1-3, said solution having a concentration which is approximately saturated at the temperature of reaction, reacting said solution with a solution of alkaline earth metal chloride which is approximately saturated at the temperature of reaction so as to produce a substantially saturated solution of ferrous chloride, the reaction also being conducted while maintaining the said pH in the reaction mixture, and recovering the ferrous chloride thus produced.

2. Preparing an acid solution of ferrous sulphate having a pH of 1-3, said solution having a concentration which is approximately saturated at the temperature of reaction, reacting said solution with a solution of calcium chloride which is approximately saturated at the temperature of reaction so as to produce a substantially saturated solution of ferrous chloride, the reaction also being conducted while maintaining the said pH in the reaction mixture, and recovering the ferrous chloride thus produced.

3. Preparing an acid solution of ferrous sulphate having a pH of 1-3, said solution having a concentration which is approximately saturated at the temperature of the reaction, reacting said solution with a solution of alkaline earth metal chloride which is approximately saturated at a temperature of approximately 70° C., so as to produce a substantially saturated solution of ferrous chloride, the reaction also being conducted while maintaining the said pH in the reaction mixture, and recovering the ferrous chloride thus produced.

4. Preparing an acid solution of ferrous sulphate having a pH of 1-3, said solution having a concentration which is approximately saturated at the temperature of reaction, reacting said solution with a solution of calcium chloride which is approximately saturated at the temperature of reaction so as to produce a substantially saturated solution of ferrous chloride, the reaction also being conducted while maintaining the said pH in the reaction mixture and maintaining an excess of about 2% to 5% calcium chloride to prevent contamination of the ferrous chloride with unreacted ferrous sulfate, and recovering the ferrous chloride thus produced.

5. Preparing an acid solution of ferrous sulphate having a pH of 1-3, said solution having a concentration which is approximately saturated at the temperature of reaction, reacting said solution with a solution of alkaline earth metal halide, selected from the group consisting of chlorides, bromides and iodides, which is approximately saturated at the temperature of reaction so as to produce a substantially saturated solution of the corresponding ferrous halide, the reaction also being conducted while maintaining the said pH in the reaction mixture, and recovering the ferrous halide thus produced.

THOMAS C. OLIVER.
RALPH D. LONG.
LEO H. CROSSON.